United States Patent
Terazaki

(10) Patent No.: US 7,854,776 B2
(45) Date of Patent: Dec. 21, 2010

(54) REACTOR INCLUDING A PLURALITY OF SUBSTRATES TO FORM A REACTOR MAIN BODY PORTION AND AN ENVELOPE PORTION

(75) Inventor: Tsutomu Terazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 986 days.

(21) Appl. No.: 11/646,029

(22) Filed: Dec. 27, 2006

(65) Prior Publication Data

US 2007/0148502 A1  Jun. 28, 2007

(30) Foreign Application Priority Data

Dec. 28, 2005  (JP)  ............... 2005-378606

(51) Int. Cl.
*H01M 8/00*  (2006.01)
(52) U.S. Cl. .................. 48/127.9; 48/61; 422/130; 422/187; 422/189; 429/400
(58) Field of Classification Search .......... 422/129–242
See application file for complete search history.

(56) References Cited

U.S. PATENT DOCUMENTS

| 7,531,016 | B2 | 5/2009 | Yamamoto et al. | |
| 2004/0244290 | A1* | 12/2004 | Yamamoto et al. | 48/127.9 |
| 2005/0244685 | A1* | 11/2005 | Kim et al. | 429/20 |

FOREIGN PATENT DOCUMENTS

| JP | 2001-50160 A | 2/2001 |
| JP | 2003-48702 A | 2/2003 |
| JP | 2005-126286 A | 5/2005 |
| JP | 2005-270727 A | 10/2005 |

(Continued)

OTHER PUBLICATIONS

Japanese Office Action dated Oct. 6, 2009 and English translation thereof issued in a counterpart Japanese Application No. 2005-378606.

(Continued)

*Primary Examiner*—Ula C Ruddock
*Assistant Examiner*—Imran Akram
(74) *Attorney, Agent, or Firm*—Holtz, Holtz, Goodman & Chick, PC

(57) ABSTRACT

A reactor causing reaction of a reactant includes a plurality of substrates provided with top and bottom substrates having provided therein recessed portions for forming closely sealed regions and a plurality of intermediate substrates having provided therein at least openings that communicate with each other, a reactor main body portion including a reaction unit at which the intermediate substrates are formed to be laminated and joined with each other and a reaction flow channel reactant flows formed therein, and an envelope portion which houses the reactor main body portion therein except one end side thereof, via a closely sealed space formed by sandwiching the laminated intermediate substrates between the top and the bottom substrates and by communicating the opening and the closely sealed region on the substrates, and including a support portion which supports the reactor main body portion via the one end side of the reactor main body portion.

10 Claims, 8 Drawing Sheets

FOREIGN PATENT DOCUMENTS

| | | |
|---|---|---|
| JP | 2005-314207 A | 11/2005 |
| TW | 226721 B | 1/2005 |
| TW | 228844 B | 3/2005 |
| TW | 229013 B | 3/2005 |

OTHER PUBLICATIONS

Taiwanese Office Action dated Jun. 17, 2010 and English translation thereof, issued in counterpart Taiwanese Application No. 095149198.

* cited by examiner

REACTOR INCLUDING A PLURALITY OF SUBSTRATES TO FORM A REACTOR MAIN BODY PORTION AND AN ENVELOPE PORTION

CROSS-REFERENCE TO RELATED APPLICATIONS

This application is based upon and claims the benefit of priority from prior Japanese Patent Application No. 2005-378606, filed Dec. 28, 2005, the entire contents of which are incorporated herein by reference.

BACKGROUND OF THE INVENTION

1. Field of the Invention

The present invention relates to a reactor to which a reactant is supplied, and which causes reaction of the reactant.

2. Description of the Related Art

In recent years, a fuel cell has been attracting attention as a clean power supply system with its high efficiency of energy conversion, and is practically used for a fuel cell automobile or an electrified housing. In addition, in a cellular phone or a notebook-type personal computer that is downsized or highly functioned as mobile means as well, a research and development for downsizing, and reducing the cost of, the fuel cell, thereby mounting a fuel cell as a power supply has been promoted.

The fuel cell used here is a device that generates electric energy by electrochemical reaction between a fuel consisting of hydrogen, for example, and oxygen. Such a fuel cell is equipped with a reactor having a reformer that generates hydrogen from a mixture gas of a fuel and water, for example.

A reacting device such as an independently arranged reformer or a carbon monoxide remover is connected by a connecting pipe or the like, thereby configuring this reactor. A liquid fuel such as gasified alcohols and gasoline and a high temperature water vapor are reformed and reacted in a reformer set at a comparatively high temperature, thereby taking out hydrogen, and carbon monoxide that is a by-product of the reforming reaction is removed in a carbon monoxide remover set at a comparatively low temperature (Jpn. Pat. Appln. KOKAI Publication No. 2003-48702).

In the reactor as described above, a reacting device such as a reformer or an carbon monoxide remover is independently arranged, and reacting devices are connected to each other by means of a connecting pipe or the like, thereby configuring the reactor. Thus, it has been difficult to minimize the reactor to an extent such that it can be mounted on a portable telephone, a notebook-type personal computer and the like.

In addition, a process for manufacturing the reactor has become complicated and cost reduction has been difficult because a reacting device such as a reformer or a carbon monoxide remover is separately manufactured.

In addition, in order to retain a temperature of each reacting device and improve thermal efficiency, a heat insulation container surrounding each reacting device is provided, whereby a hollow heat insulation structure may be formed. In this case, a plurality of supply ports or discharge ports for supplying a reactant to each reacting device and discharging a product from each reacting device are provided at the side of a heat insulation container, and such each reacting device and heat insulation container are connected to each other at that portion. At this time, if each reacting device is set at a predetermined temperature, as a result of an occurrence of a comparatively large temperature difference between the reacting device and the heat insulation container, a comparatively large thermal stress works on a connection portion, whereby the connection portion may be damaged or cracked.

BRIEF SUMMARY OF THE INVENTION

The present invention has an advantage that there can be provided a reactor that can be comparatively easily manufactured, the reactor being capable of reducing a thermal stress generated in the case where a reaction unit set at a predetermined temperature is provided inside the reactor.

In order to obtain the above advantage, one aspect of the present invention provides a reactor causing reaction of a reactant, the reactor comprising: a plurality of substrates including a pair of a top substrate and a bottom substrate having provided therein recessed portions for forming closely sealed regions and a plurality of intermediate substrates having provided therein at least openings that communicate with each other, a reactor main body portion including a reaction unit at which said plurality of intermediate substrates are formed to be laminated and joined with each other and a reaction flow channel through which the reactant flows is formed to cause reaction of the reactant; and an envelope portion which houses the reactor main body portion therein except one end side thereof, via a closely sealed space formed by sandwiching said plurality of laminated intermediate substrates between the top substrate and the bottom substrate to be laminated and joined with each other and by communicating the opening and the closely sealed region on said plurality of substrates, and including a support portion which supports the reactor main body portion via the one end side of the reactor main body portion.

In order to obtain the above advantage, another aspect of the present invention provides a power supply system which generates electric power and supplies the generated electric power to a load, the system comprising: a reactor to which an electric power generation fuel is supplied, and which generates a specific fuel component including hydrogen from the electric power generation fuel; and an electric power generation portion including a fuel cell which generates the electric power in accordance with an electrochemical reaction using the specific fuel component, wherein the reactor includes a plurality of substrates that include a pair of a top substrate and a bottom substrate having provided therein recessed portions for forming closely sealed regions and a plurality of intermediate substrates having provided therein at least openings that communicate with each other, a reactor main body portion including a reaction unit at which said plurality of intermediate substrates are formed to be laminated and joined with each other and a reaction flow channel through which a reactant flows is formed to cause reaction of the reactant; and an envelope portion which houses the reactor main body portion therein except one end side thereof, via a closely sealed space formed by sandwiching said plurality of laminated intermediate substrates between the top substrate and the bottom substrate to be laminated and joined with each other and by communicating the opening and the closely sealed region on said plurality of substrates, and including a support portion which supports the reactor main body portion via the one end side of the reactor main body portion.

A reactor in the present invention is featured by: preparing a plurality of substrates including a pair of an upper substrate and a lower substrate having provided therein recessed portions for forming closely sealed regions and a plurality of intermediate substrates having provided therein at least openings communicating with each other; laminating said plurality of intermediate substrates; joining the laminated intermediate substrates with each other by means of anodic bonding, for example; forming a reaction flow channel in which a reactant flows; forming a reactor main body portion that includes a reaction unit causing reaction of a reactant; sandwiching and laminating said plurality of laminated intermediate substrates between the upper substrate and the lower substrate; joining the laminated intermediate substrates by means of anodic bonding in an air pressure that is lower than an atmospheric pressure, for example; communicating the opening and the closely sealed region to form a sealed space; removing one end of the reactor main body portion via the closely sealed space to be housed therein; and forming an envelope portion having a support portion which supports the reactor main body portion integrally with the reactor main body portion via the one end side of the reactor main body portion.

DETAILED DESCRIPTION OF THE INVENTION

Hereinafter, a reactor according to the present invention will be described in detail with reference to an embodiment shown in the accompanying drawings.

Although a variety of limitations that are technically preferred to carry out the present invention are applied to the embodiments described below, the scope of the invention is not limited to the following embodiments and illustrative examples.

Figure 1:
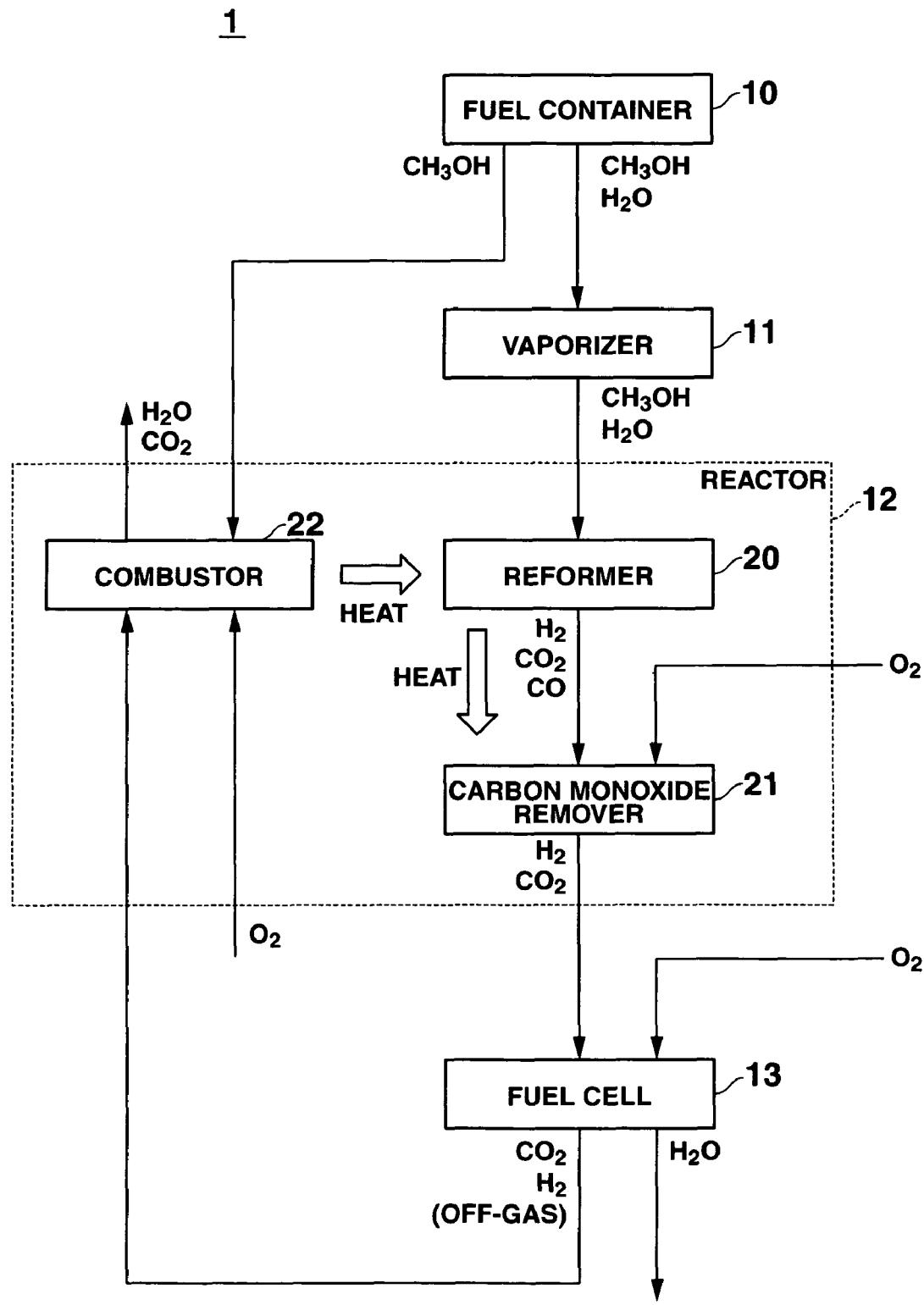
FIG. 1 is a block diagram depicting a schematic configuration of an electric power generator to which a reactor according to an embodiment of the present invention is applied.

FIG. 1 is a block diagram depicting a schematic configuration of an electric power generator 1 to which a reactor according to an embodiment of the present invention is applied.

As shown in FIG. 1, an electric power generator (power supply system) 1 is equipped with: a fuel container 10; a vaporizer 11; a reactor (micro-reactor) 12 according to the present invention; and a fuel cell 13.

The fuel container 10 reserves a fuel and water. As the fuel reserved in this fuel container 10, a liquid fuel having a hydrogen atom in constitution, for example, a hydrocarbon-based liquid fuel can be applied. Specifically, there are exemplified: alcohols or the like such as methanol and ethanol; ethers such as dimethyl ether, and gasoline.

In the present embodiment, methanol is used as a fuel, whereas another compound may be used. In the fuel container 10, a fuel and water may be reserved separately or may be reserved in a mixed state.

The vaporizer 11 vaporizes the fuel and water supplied from the fuel container 10. For example, two substrates are joined to the vaporizer 11, a zigzag-like micro-flow channel, for example, is formed on a junction face of at least one of these substrates, namely, on an inside face; and, on an outside face of each substrate, there is provided a structure having formed therein a thin-film heater made of an electric heat material such as a heating resistor or a heating semiconductor heated by applying a voltage. By means of this thin-film heater, the fuel and water supplied to the micro-flow channel in the vaporizer 11 from the fuel container 10 are heated and vaporized.

The reactor 12 generates hydrogen from the fuel and water vapor supplied and vaporized from the vaporizer 11, and is equipped with a reformer (first reaction unit) 20; a carbon monoxide remover (second reaction unit) 21; and a combustor (heating unit) 22. The reformer 20 reforms the fuel (first reactant) and water vapor (first reactant) supplied and vaporized from the vaporizer 11 by means of a reforming reaction using a catalytic reaction, and then, generates a mixture gas (reactant/product) including hydrogen.

In the case of using methanol as a fuel, in the reformer 20, a mixture gas including hydrogen is generated by means of a reforming reaction shown in chemical reaction formula (1) below. At this time, a trace amount of carbon monoxide is generated as a by-product by means of chemical reaction shown in Formula (2).

A mixture gas (reacted product, second reactant) and air (second reactant) are supplied from the reformer 20 to the carbon monoxide remover 21, and carbon monoxide in these mixture gases is selectively oxidized and removed by means of a carbon monoxide removing reaction shown in chemical reaction formula (3) below by a catalyst.

In the combustor 22, air, a mixture gas (off-gas) including unreacted hydrogen discharged from the fuel cell 13, and partial fuel from the fuel container 10 are supplied, and a combustion heat is generated by means of a combustion reaction using a catalyst for oxidizing them.

$$CH_3OH+H_2O \rightarrow 3H_2+CO_2 \quad (1)$$

$$H_2+CO_2 \rightarrow H_2O+CO \quad (2)$$

$$2CO+O_2 \rightarrow 2CO_2 \quad (3)$$

A detailed description of the above reactor 12 will be given later. The reactor 12 is integrated by assembling the reformer 20, the carbon monoxide remover 21, and the combustor 22. A combustion heat generated by the combustor 22 is supplied to the reformer 20, and the reformer 20 is set at a predetermined temperature (first temperature). In addition, the carbon monoxide remover 21 is set at a predetermined temperature (second temperature) that is lower than a temperature of the reformer 20 by means of thermal conduction via a connecting portion 100 described later at which the reformer 20 and the carbon monoxide remover 21 communicate with each other, and the above chemical reaction is carried out. There may be further provided a configuration in which a vaporizer is separately interposed between the fuel container 10 and the combustor 22, and part of the fuel is vaporized by means of this vaporizer and is supplied to the combustor 22.

The fuel cell 13 is an electric power generator cell for generating electric energy by means of an electrochemical reaction of hydrogen generated by means of the reactor 12 and, for example, is equipped with: a fuel electrode having catalytic fine particles carried therein; an air electrode having catalytic fine particles carried therein; and a film shaped solid polymeric electrolytic film interposed between the fuel electrode and the air electrode. A mixture gas mainly including hydrogen is supplied from the carbon monoxide remover 21 to the fuel electrode of the fuel cell 13, and the air from the outside is supplied to the air electrode of the fuel cell 13. In the fuel electrode, as shown in electrochemical reaction formula (4) below, hydrogen in the mixture gas is subjected to action of the catalytic particles of the fuel electrode, and is separated into hydrogen ions and electrons. The separated hydrogen ions are conducted to an oxygen electrode through the solid polymeric electrolytic film, and the electrons are removed by means of the fuel electrode. In the oxygen electrode, as shown in electrochemical reaction formula (5) below, the electrons moved to the oxygen electrode; oxygen in air; and hydrogen ions having passed through the solid polymeric electrolytic film are reacted with each other, and water is generated. The movement of electrons at this time is produced as electric energy.

$$H_2 \rightarrow 2H_+ + e^- \tag{4}$$

$$2H^+ + \tfrac{1}{2}O_2 + e^- \rightarrow H_2O \tag{5}$$

The electric power generator 1 above is mounted on, for example, a digital camera, a cellular phone, a notebook-type personal computer, a wristwatch, a PDA, an electronic calculator, and any other electronic equipment main body. The vaporizer 11, the reactor 12, and the fuel cell 13 are incorporated in the electronic equipment main body, and the fuel container 10 is removably provided to the electronic equipment main body. In the case where the fuel container 10 is mounted on the electronic equipment main body, the fuel and water contained in the fuel container 10 is supplied to the vaporizer 11 by means of a pump, for example.

Now, a configuration of the reactor 12 in the present invention will be described in a further detail.

Figure 2:
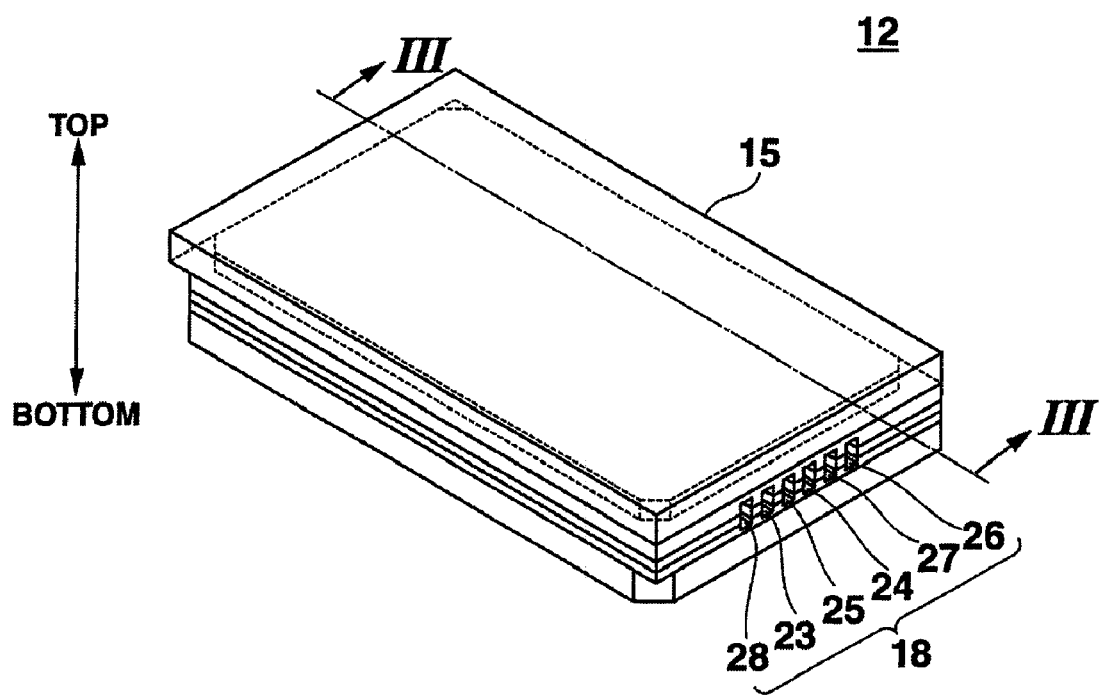
FIG. 2 is a perspective view showing a reactor in the present embodiment.

FIG. 2 is a perspective view showing the reactor in the present embodiment.

Figure 3:
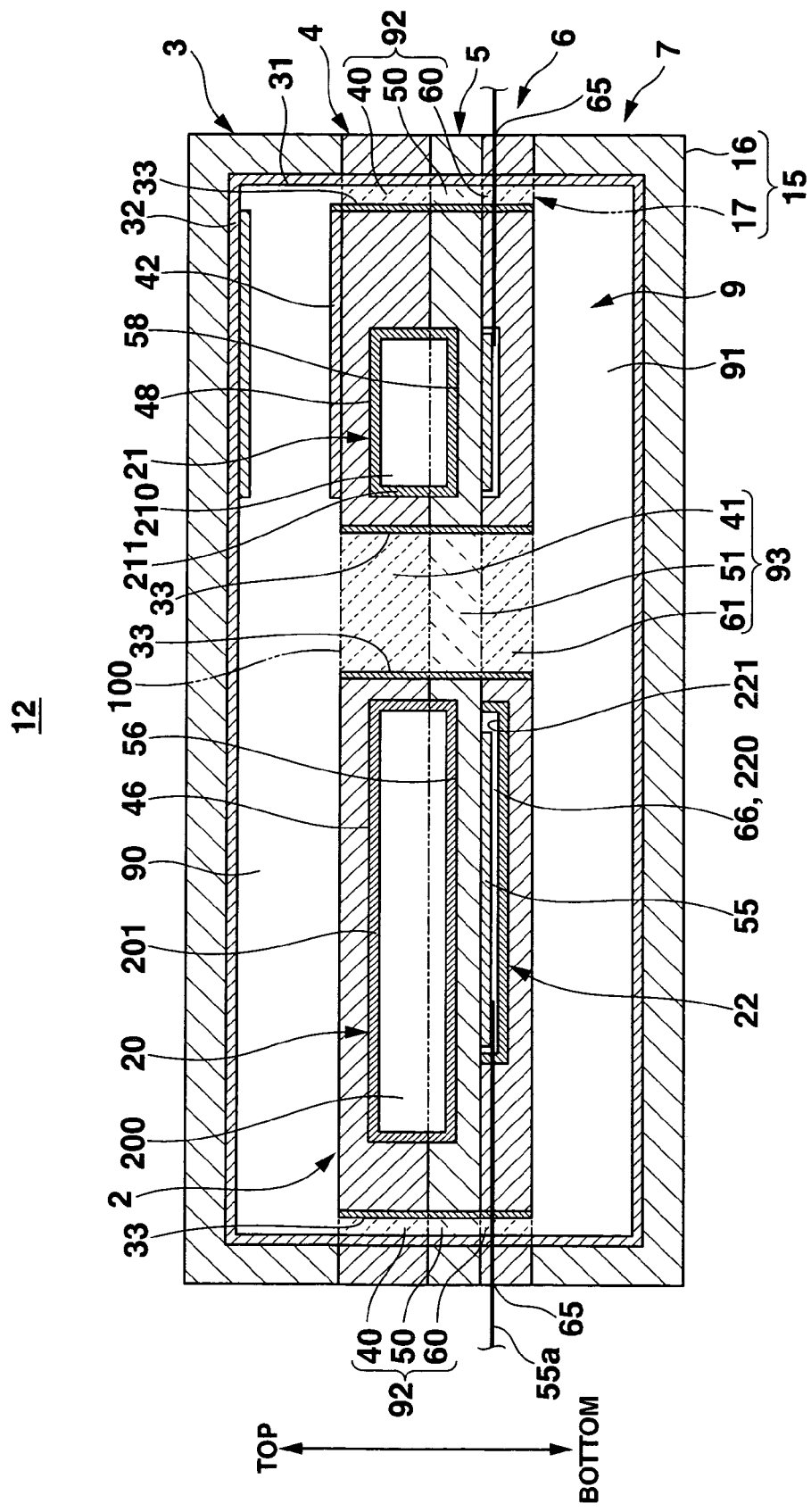
FIG. 3 is a sectional view taken along the line III-III of the reactor shown in FIG. 2.

FIG. 3 is a sectional view taken along the line III-III of the reactor shown in FIG. 2.

Figure 4:
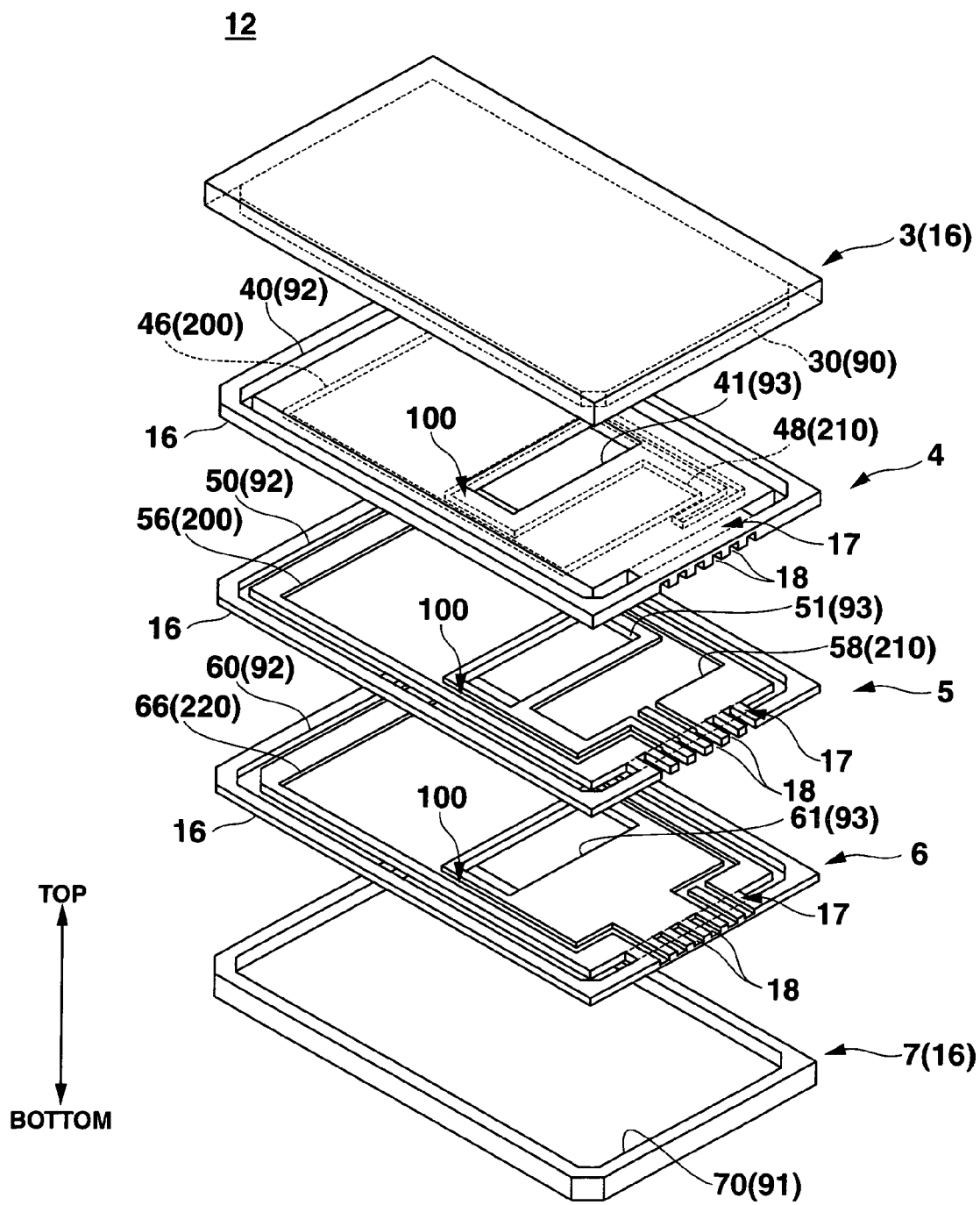
FIG. 4 is an exploded perspective view showing the reactor in the present embodiment.

FIG. 4 is an exploded perspective view showing the reactor in the present embodiment.

In the following description, an upper face of FIG. 2 is defined as a top face, and a lower face thereof is defined as a back face.

As shown in FIGS. 2 and 3, the reactor 12 is configured to have a plate shape while a plurality of substrates are laminated, and a reactor main body portion 2 is provided inside the reactor.

This reactor main body portion 2, as shown in FIG. 3, is internally equipped with a reforming reaction chamber 200 of the reformer 20; a carbon monoxide removal flow channel 210 of the carbon monoxide remover 21; and a combustion reaction chamber 220 of the combustor 22.

The reforming reaction chamber 200 is a chamber (reaction flow channel) for carrying out the above reforming reaction, and carries a reforming catalyst 201 for generating hydrogen from hydrocarbon such as methanol and water on an internal wall face, preferably on the entire reaction chamber. This reforming catalyst 201 is, for example, a copper/oxidized lead-based catalyst, and causes alumina serving as a carrier to carry copper/oxidized lead.

The carbon monoxide removal flow channel 210 is a chamber (reaction flow channel) for carrying out the above carbon monoxide removing reaction, and carries a carbon monoxide removing catalyst 211 for oxidizing another carbon monoxide slightly generated by a reforming catalyst 201 such as hydrogen to generate carbon dioxide on an internal wall face and preferably substantially fully of the chamber. This carbon monoxide removing catalyst 211 is a platinum/alumina-based catalyst, for example, and causes alumina to carry platinum or platinum and ruthenium.

The combustion reaction chamber 220 is a chamber (reaction flow channel) for carrying out the above combustion reaction, and carries, for example, a platinum-based combustion catalyst 221 for effectively causing the combustion reaction on an internal wall face and preferably substantially fully of the chamber. This combustion reaction chamber 220 is heating unit in the present invention so as to supply heat to the reforming reaction chamber 200 or the like.

The above reactor main body portion 2 is arranged and fixed inside a hollow package portion 15 equipped with an envelope portion 16 or housing and a support portion 17. The envelope portion 16 envelopes the reactor main body portion 2, and then houses the reactor main body portion 2 in a space formed by a closely sealed space or chamber 9. On an internal face of the envelope portion 16, an infrared ray reflection film 31 that prevents heat radiation by reflecting heat rays going from the reactor 12 to the outside to the inside is provided preferably substantially fully of the internal face.

The closely sealed chamber 9 is made of first to fourth heat insulation chambers 90 to 93. Among them, the first to third heat insulation chambers 90 to 92 are interposed between the reactor main body portion 2 and the enveloped portion 16 so as to prevent external heat radiation of the reactor 12.

In more detail, the first heat insulation chamber 90 is interposed between a surface or a top face of the reactor main body portion 2 and an internal face of an upper part of the envelope portion 16, namely the infrared ray reflection film 31; the second heat insulation chamber 91 is interposed between a back face or a bottom face of the reactor main body portion 2 and an internal face of a lower part of the envelope portion 16, namely the infrared ray reflection film 31; and the third heat insulation chamber 92 is interposed between a side peripheral face of the reactor main body portion 2 and an internal face of a side wall of the envelope portion 16. The fourth heat insulation chamber 93 is interposed between the reforming reaction chamber 200 and the carbon monoxide removal flow channel 210 and between the combustion reaction chamber 220 and the carbon monoxide removal flow channel 210.

The reforming reaction chamber 200 and the carbon monoxide removal flow channel 210 are connected to or caused to communicate with each other by means of a connection portion 100 including a plurality of flow channels described later. On the other hand, a predetermined temperature difference is maintained in the reforming reaction chamber 200 and the carbon monoxide removal flow channel 210 by means of the heat insulation chamber 93 in which the connection portion 100 has been housed, so as to set a reaction temperature in the carbon monoxide removal flow channel 210 at a comparatively low temperature with respect to reaction temperatures in the reforming reaction chamber 200 and combustion reaction chamber 220. The inside of the above closely sealed space 9 is obtained as a vacuum pressure that is lower than an atmospheric pressure in the present embodiment. Specifically, an atmospheric pressure lower than 10 Pa, or preferably an atmospheric pressure lower than 1 Pa is obtained.

The above support portion 17, as shown in FIGS. 3 and 4, supports the reactor main body portion 2 by connecting the envelope portion 16 and one end of the reactor main body portion 2 to each other, and in more detail, an end that is closer to the carbon monoxide removal flow channel 210 than the reforming reaction chamber 200, and the hollow package portion 15 is integrated with the reactor main body portion 2.

At this support portion 17, there is provided a supply/discharge portion 18 for supplying from the outside to the reactor main body portion 2 the reactant used for the reforming reaction, the carbon monoxide removing reaction, and the combustion reaction at the reactor main body portion 2 and for discharging a product caused by these reactions to the outside (reference is made to FIGS. 5B to 5D described later).

This supply/discharge portion 18, as shown in FIG. 2, has: a reaction supply port 23 that opens on an outer face of the hollow package portion 15; an oxygen auxiliary supply port 24; a reaction discharge port 25; a fuel supply port 26; a fuel oxygen supply port 27; and a fuel discharge port 28.

Among them, the reaction supply port 23 flows into the reactor main body portion 2 the hydrocarbon such as methanol and water that reform a substance into hydrogen in the reformer 20, and communicates with the vaporizer 11. The oxygen auxiliary supply port 24 is provided as an oxygen supply port in the present invention, and causes oxygen for selectively oxidizing carbon monoxide in the carbon monoxide remover 21 to flow inside. The reaction discharge port 25 discharges a mixture gas mainly including hydrogen, generated by the reforming reaction and the carbon monoxide removing reaction, and communicates with the fuel cell 13. The fuel supply port 26 takes in off-gas including hydrogen used for combustion at the combustor 22 or methanol or the like as a fuel for use in combustion. The fuel oxygen supply port 27 causes oxygen used for combustion at the combustor 22 to flow inside. The fuel discharge port 28 discharges carbon dioxide and water generated by combustion in the combustor 22. A pump device or the like (not shown) for compressively supplying a fuel is connected to each one of the fuel supply port 26 and the fuel oxygen supply port 27.

The above reactor 12, as shown in FIG. 4, is formed by laminating a first substrate 3, a second substrate 4, a third substrate 5, a fourth substrate 6, and a fifth substrate 7 sequentially in this order.

That is, a back face of the first substrate 3 and a surface of the second substrate 4 are joined with each other; a back face of the second substrate 4 and a surface of the third substrate 5 are joined with each other; a back face of the third substrate 5 and a surface of the fourth substrate 6 are joined with each other; and a back face of the fourth substrate 6 and a surface of the fifth substrate 7 are joined with each other. The first substrate 3 to fifth substrate 7 each have a substantially rectangular shape viewed in a planar manner; the dimensions taken along an outer edge are substantially identical to each other; and at least part of a side face of each substrate faces to each other.

In addition, the first substrate 3 is provided as a top substrate in the present invention; the second substrate 4 to the fourth substrate 6 are provided as intermediate substrates in the present invention; and the fifth substrate 7 is provided as a bottom substrate in the present invention.

In the present embodiment, the first substrate 3 to the fifth substrate 7 are provided as glass-based substrates, and in more detail, these substrates are provided as glass substrates containing Na or Li serving as a mobile ion. As such a glass substrate, for example, it is preferable to use a Pyrex (registered trademark) substrate. In addition, in FIGS. 4 and 5A to 5E described later, there are briefly shown: groove portions 46 and 48 forming reaction flow channels, groove portions 56 and 58 forming reaction flow channels, and a groove portion 66 or the like forming a reaction flow channel.

FIGS. 5A to 5E are plan views showing the first substrate to the fifth substrate in the reactor of the present embodiment.

Figure 5A:
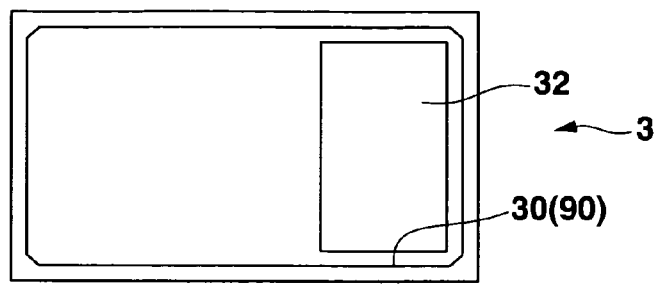
FIGS. 5A to 5E are plan views showing a first substrate to a fifth substrate in the reactor of the present embodiment.

As shown in FIG. 5A, a rectangular recessed portion 30 is formed at a back face side of the first substrate 3, namely, on a face opposite to the surface of the second substrate 4. As described later, a rectangular recessed portion 70 is formed on a surface side of the fifth substrate 7, namely, on a face opposite to a back face of the fourth substrate 6; the first substrate 3 and the fifth substrate 7 are formed in pair; and, in the case where the back face side of the first substrate 3 an the surface side of the fifth substrate 7 are aligned with each other, one closely sealed region is formed by the recessed portion 30 and the recessed portion 70. On the internal face of the recessed portion 30 of the first substrate 3, the infrared ray reflection film 31 (refer to FIG. 3) that prevents heat radiation by reflecting the heat rays radiated from the reactor 12 to the outside on the inside of the recessed portion 30 is provided as described previously.

This infrared ray reflection film 31 is formed by forming gold, aluminum, silver, copper and the like as a film in accordance with a gas phase technique such as a sputtering technique or a vacuum evaporation technique, and a reflection factor of infrared rays (wavelength 5 to 30 µm) generated in a temperature range of several hundreds of ° C. that is an operating temperature of the reformer 20 is obtained as substantially 100%. In the case where the infrared ray reflection film 31 is formed of gold, an undercoat adhesion layer made of chrome, titanium, tantalum, molybdenum and the like may be provided in order to enhance adhesion.

Among the internal face of the recessed portion 30, for example, a film shaped getter element 32 may be provided on the infrared ray reflection film 31 in a region that corresponds to the carbon monoxide remover 21, for example. This getter element 32 is activated by heating, thereby adsorbing ambient gas or fine particles, and the gas existing in the closed space 9 of the reactor 12 is adsorbed, whereby the degree of vacuum of the closed space 9 can be enhanced or maintained. As a material for such a getter element 32, for example, an alloy consisting essentially of zirconium, barium, titanium, or vanadium can be exemplified.

An electric heater such as an electric heating element for heating and activating the getter element 32 is provided at the getter element 32, so that an electric wire of this electric heater may be led out to the outside of the hollow package portion 15.

Figure 5B:
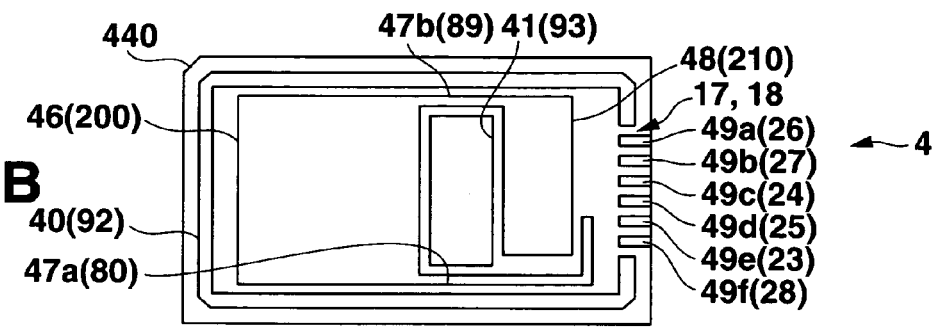

The second substrate 4, as shown in FIG. 5B, has a triangular cutout portion 440 at one corner part of one end (left side end in the figure). First and second holes (openings) 40 and 41 penetrating from the top to the bottom are provided on this second substrate 4. The first hole 40 extends along the peripheral edge of the second substrate 4, and is formed in a substantial C-shape that opens at the side of the other end of the second substrate 4. Namely, the hole 40 is provided along the peripheral edge of the second substrate 4 except a center region at the side of the other end of the second substrate 4. The second hole 41 is formed in a rectangular shape at the center of the second substrate 4. On the internal periphery face of these holes 40 and 41, there may be provided an irradiation proof film 33 having a heat insulation effect by preventing heat radiation while reflecting to the inside of the heat rays irradiated from the inside to the outside of the second substrate 4. These irradiation proof films 33 are formed of a metal such as aluminum, for example.

A getter element 42 similar to the above described getter element 32 (refer to FIG. 3) may be provided on a region that corresponds to the carbon monoxide remover 21, for example, on the surface of the second substrate 4, i.e., on a face opposite to the recessed portion 30 of the first substrate 3. It is preferable that the getter elements 32 and 42 be provided in location in which the temperatures of the getter elements 32 and 42 does not exceeds their activation temperature during operation of the reactor 12.

A groove portion (reaction flow channel) 46, groove portions (flow channels) 47a and 47b, a groove portion (reaction flow channel) 48, and groove portions (flow channels) 49a to 49f are formed on a back face of the second substrate 4, namely, on a junction face with the third substrate 5. Among the region enclosed by the hole 40, the groove portion 46 forming the reaction flow channel is provided in a zigzag shape, for example, in a region at the side of such one end. The above reforming catalyst 201 (refer to FIG. 3) is carried on the internal wall face of this groove portion 46.

The groove portion 47a forming a flow channel is provided so as to extend from an end of the groove portion 46 up to a region at the side of the other end rather than the hole 41 among the region surrounded by the hole 40. The groove portion 47b forming a flow channel is provided so as to extend from an end of the groove portion 46 up to the groove portion 48.

The groove portion 48 forming a reaction flow channel is provided in a zigzag shape, for example, in a region at the side of the other end rather than the hole 41 among the region surrounded by the hole 40. The above described carbon monoxide removal catalyst 211 (refer to FIG. 3) is carried on the internal wall face of this groove portion 48.

The groove portions 49a to 49f forming flow channels are provided in line with the other end of the second substrate 4; opens at a side face of the other end side of the second substrate 4 at one end; and is closed at the other end.

Figure 5C:
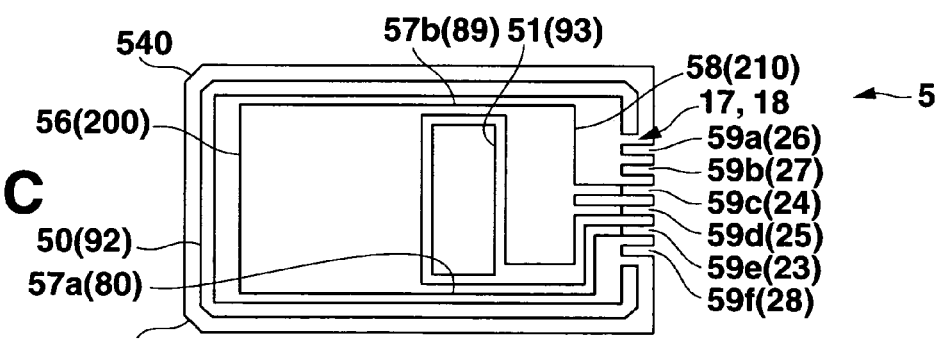

The second substrate 5, as shown in FIG. 5C, has cutout portions 540 and 541 and cutout portions 59a to 59f. The cutout portions 540 and 541 are provided in a triangular shape at both of the corner parts of one end of the third substrate 5 (left side end in the figure).

The cutout portions 59a to 59f are linearly arranged at the other end of the third substrate 5 in association with groove portions 49a to 49f of the second substrate 4 so as to be opposed to the groove portions 49a to 49f when the second substrate 4 and the third substrate 5 are overlapped on each other. Among them, the cutout portions 59a, 59b, and 59f open at a side face of the other end side of the third substrate 5 in one end and are closed at the other end. In addition, the cutout portions 59c and 59d open at a side face of the other end side of the third substrate 5 at one end and communicate with a groove portion 58 described later at the other end. In addition, the cutout portion 59e opens at a side face of the other end side of the third substrate 5 at one end and communicates with a groove portion 57a described later at the other end.

First and second holes (openings) 50 and 51 penetrating from the top to bottom are provided on this third substrate 5.

The first hole 50 extends along the peripheral edge of the third substrate 5 and is formed in a substantial C-shape opening at the other end side of the third substrate 5. Namely, the hole 50 is provided along the peripheral edge of the third substrate 5 except a center region at the other end side of the third substrate 5. In addition, the hole 51 is formed in a rectangular shape at the center of the third substrate 5. These holes 50 and 51 correspond to the holes 40 and 41 of the second substrate 4, respectively, and communicate with the holes 40 and 41 when the second substrate 4 and the third substrate 5 are overlapped on each other. An irradiation proof film 33 having a heat insulation effect may be provided on the inner periphery face of these holes 50 and 51 as well.

On a back face of the third substrate 5, namely, on a junction face with the fourth substrate 6, as shown in FIG. 3, a thin-film heater 55 serving as a heating portion in the present invention is provided in a zigzag shape, for example. This thin-film heater 55 is provided as an electric heat element such as a heating resistor or a heating semiconductor heated by applying a voltage, and supplies heat to the reforming reaction chamber 200 or the carbon monoxide removal flow channel 210. An electric wire 55a that is electrically conductive between an inside and an outside of the reactor 12 is connected to this thin-film heater 55.

The thin-film heater 55 may be provided on each of the top and back faces of the third substrate 5 or may be provided on only the back face. In addition, it is preferable that the electric wire 55a be thin, and thus, in the present embodiment, a kovar wire was used as the electric wire 55a, and the wire diameter was determined to be 0.2 mm. However, as the electric wire 55a, there may be used an iron-nickel alloy wire, a Jumet wire and the like formed by coating a core material of the iron-nickel alloy with a copper layer.

On a surface of the third substrate 5, namely, on a junction face with the second substrate 4, a groove portion 56 forming a reaction flow channel, groove portions 57a and 57b forming flow channels, and a groove portion 58 forming a reaction flow channel are formed as shown in FIG. 5C. The groove portion 56 forming a reaction flow channel is provided in a zigzag shape, for example, in a region at the side of such one end rather than the hole 51 among the region surrounded by the hole 50. The above described reforming catalyst 201 (refer to FIG. 3) is carried on the internal wall face of this groove portion 56. This groove portion 56 corresponds to a region in which the groove portion 46 of the second substrate 4 is formed so as to be opposed to a region in which the groove portion 46 is formed, when the second substrate 4 and the third substrate 5 are overlapped on each other.

The groove portion 57a is provided from an end of the groove portion 56 up to the cutout portion 59e. In addition, the groove portion 57b is provided from an end of the groove portion 56 to the groove portion 58. These groove portions 57a and 57b correspond to the groove portions 47a and 47b of the second substrate 4 so as to be opposed to the groove portions 47a and 47b when the second substrate 4 and the third substrate 5 are overlapped on each other.

The groove portion 58 forming a reaction flow channel is provided in a zigzag shape, for example, in a region at the side of the other end rather than the hole 51 among the region surrounded by the hole 50. This groove portion 58 corresponds to a region in which the groove portion 48 of the second substrate 4 is formed, so as to be opposed to a region in which the groove portion 48 is formed, when the second substrate 4 and the third substrate 5 are overlapped on each other. The above described carbon monoxide removal catalyst 211 (refer to FIG. 3) is carried on the internal wall face of this groove portion 58.

Figure 5D:
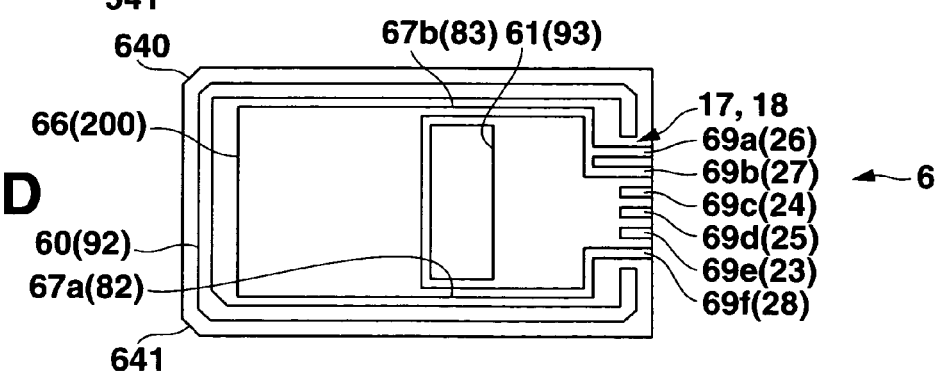

The fourth substrate 6 has, as shown in FIG. 5D, triangular cutout portions 640 and 641 at each corner part of one end (left side end in the figure). The fourth substrate 6 has first and second holes (openings) 60 and 61 that penetrate from the top to bottom. The first hole 60 extends along the peripheral edge of the fourth substrate 6, and then, is formed in a substantial C-shape that opens at the side of the other end of the fourth substrate 6. Namely, the hole 60 is provided along the peripheral edge of the fourth substrate 6 except a known recessed portion region at the side of the other end of the fourth substrate 6. The second hole 61 is formed in a rectangular shape at the center of the fourth substrate 6. These holes 60 and 61 correspond to the holes 50 and 51 of the third substrate 5, respectively, so as to communicate with the holes 50 and 51 when the third substrate 5 and the fourth substrate 6 are overlapped on each other. An irradiation proof film 33 having a heat insulation effect may be provided on the internal periphery face of these holes 60 and 61.

In addition, a groove portion 66 forming a reaction flow channel, groove portions 67a and 67b forming flow channels, groove portions 69a to 69f forming flow channels, and an electrically conductive groove 65 (refer to FIG. 3) are formed on a surface of the fourth substrate 6, namely, on a junction face with the third substrate 5.

The groove portion 66 is provided in a zigzag shape, for example, in a region at the side of such one end rather than the hole 61 among the region surrounded by the hole 60. The above described combustion catalyst 221 (refer to FIG. 3) is carried on the internal wall face of this groove portion 66.

The groove portions 67a and 67b are provided from an end of the groove portion 66 up to a region at the side of the other end rather than the hole 61 among the region surrounded by the hole 60.

The groove portions 69a to 69f are provided in line with the other end of the fourth substrate 6 in association with the cutout portions 59a to 59f of the third substrate 5 so as to be opposed to the cutout portions 59a to 59f when the third substrate 5 and the fourth substrate 6 are overlapped on each other. Among them, the groove portions 69a and 69b open at a side face of the other end side of the fourth substrate 6 at one end, join at the other end, and communicate with the groove portion 67b. In addition, the groove portions 69c to 69e open at a side face of the other end side of the fourth substrate 6 at one end and are closed at the other end. In addition, the groove portion 69f opens on a side face of the other end side of the fourth substrate 6 at one end and communicates with the groove portion 67a at the other end.

The electrically conductive groove 65, as shown in FIG. 3, is provided at each of such one end and the other end of the fourth substrate 6 so as to route the electric wire 55a connected to the thin-film heater 55 into the groove. Namely, the fourth substrate 6 is provided as an electrically conductive substrate in the present invention.

Figure 5E:

The fifth substrate 7, as shown in FIG. 5E, is formed so as to be substantially vertically symmetrical to the first substrate 3 and has corners of one end (left side ends in the figure) and triangular cutout portions 740 to 742 at corners of the other end. A rectangular recessed portion 70 is formed on the surface side of this fifth substrate 7, namely, on a face opposite to a back face of the fourth substrate 6. An infrared ray reflection film 31 similar to that provided on the internal face of the recessed portion 30 of the first substrate 3 is provided on the internal face of this recessed portion 70.

Subsequently, a method for manufacturing the reactor 12 will be described while it is divided into a method for manufacturing the first substrate 3 to the fifth substrate 7 and a method for joining the first substrate 3 to the fifth substrate 7.

(1) Method for Manufacturing the First Substrate 3 to the Fifth Substrate 7

Now, a method for manufacturing each substrate will be described here. In order to manufacture the first substrate 3 to the fifth substrate 7, first, there are prepared five glass substrates formed in a rectangular shape in a planar view, its top and back faces being flat and parallel to each other.

Now, the first substrate 3 and the fifth substrate 7 are manufactured from two glass substrates.

Specifically, first, after a metal film adapted for anodic junction described later has been filmed on a face serving as a back face of the first substrate 3 in accordance with sputtering, one face of each glass substrate (a face serving as a back face of the first substrate 3 or a face serving as a surface of the fifth substrate 7) is subjected to a photolithography technique or a sandblasting technique, thereby forming recessed portions 30 and 70 and cutout portions 740 to 742. Then, in the recessed portions 30 and 70, an infrared ray reflection film 31 is formed in accordance with sputtering or a vacuum vapor deposition technique. In this manner, the first substrate 3 and the fifth substrate 7 are manufactured.

Here, a metal film is oxidized and coupled when an anodic junction condition is met. As a metal used for this metal film, it is desirable that the metal be hardly oxidized and be stable under a normal temperature and normal pressure condition or an alloy or a compound may be used. The present embodiment describes a case in which a metal film having a high film forming rate has been formed as a film.

In order to form such a metal film, a glass substrate being targeted for film forming is set at a sputtering device, and then, a plate formed of Ta, Ti, Al or the like is used as a target, and sputtering is carried out under an atmosphere consisting of an Ar gas and an $O_2$ gas. In the sputtering process, ions collide with the above target, whereby atoms or molecules sputtered from the target are discharged; the discharged atoms or molecules collide with a glass substrate; and then, a metal film made of Ta or the like is formed on the glass substrate. It is preferable that the film thickness of this metal film be in the range of 1000 Å to 3000 Å. Further, in consideration of a stress of the film applied to the substrate, it is preferable that the film thickness be in the range of 1000 Å to 2000 Å.

Next, a second substrate 4 is manufactured from one glass substrate. Specifically, first, with respect to one face of the glass substrate (a face serving as a back face of the second substrate 4), a buffer film and a metal film adapted for anodic junction are formed sequentially in this order in accordance with sputtering; and then, holes 40 and 41, a groove portion 46, groove portions 47a and 47b, a groove portion 48, groove portions 49a to 49f, and a cutout portion 440 are formed in accordance with a photolithography technique or a sandblasting technique. In addition, with respect to the internal faces of the holes 40 and 41, the irradiation proof film 33 may be formed in accordance with sputtering or a vacuum vapor deposition technique. Then, after alumina sol serving as a catalyst adhesion layer has been applied to the insides of the groove portions 46 and 48 forming reaction flow paths, a reforming catalyst 201 and a carbon monoxide removal catalyst 211 are provided inside of the groove portion 46 and inside of the groove portion 48, respectively, in accordance with a wash coat technique, for example. In this manner, the second substrate 4 is manufactured.

The buffer film used here denotes a film of capturing an alkali component that moves in a glass substrate when a voltage is applied to the glass substrate in anodic junction described later. As such a buffer film, it is desirable to provide an electrically conductive substance having resistivity lower than that of the glass substrate and alkali ion permeability to an extent such that alkali ions in the glass substrate are partially included at the time of anodic junction, in particular, a substance having a resistivity on the order of 1 k to 50 kΩ·cm. In addition, an oxide can be used as a buffer film, and in particular, it is desirable to use an amorphous oxide rather than a polycrystalline oxide. This is because: an interatomic distance in the amorphous oxide is longer than that of the polycrystalline oxide; alkali ions are more permeable in the amorphous oxide than in the polycrystalline oxide; crystal grain boundary of the polycrystalline film has high resistance at that portion; and an electric field distribution is prone to be non-uniform, thus producing an intra-planar distortion in a junction reaction. Specifically, as a buffer film, there can be used: a compound consisting essentially of Ta, Si, and O (hereinafter, referred to as a "Ta—Si—O based material"); a compound whose constituent ratio is La:Sr:Mn:O=0.7:0.3:1 (3-x) (hereinafter, referred to as $La_{0.7}Sr_{0.3}MnO_{3-x}$); and a lead glass or the like, where $0 \leq x < 0.3$. In addition, the Ta—Si—O based material and $La_{0.7}Sr_{0.3}MnO_{3-x}$ are amorphous oxides.

In order to form a buffer film made of the Ta—Si—O based material, a glass substrate is set as an object targeted for film forming at a sputtering device, and then, sputtering is carried out under an atmosphere consisting of an Ar gas and an $O_2$ gas while a material formed by implanting Si on a plate formed of Ta is used as a target. In the sputtering process, ions collide with the above target, whereby secondary ions are discharged from the target; the discharged secondary ions collide with the glass substrate; and then, a buffer film made of a Ta—Si—O based material is formed on the glass substrate.

In addition, in order to form a buffer film made of $La_{0.7}Sr_{0.3}MnO_{3-x}$, first, lanthanum nitrate ($La(NO_3)_3 \cdot 6H_2O$), strontium nitrate ($Sr(NO_3)_3$), and manganese nitrate ($Mn(NO_3)_3 \cdot 6H_2O$) are dissolved in 1 methyl-2 pyrrolidone, and then, a lanthanum nitrate solution, a strontium nitrate solution, and a manganese nitrate solution are mixed with each other. Next, the prepared solution is coated on a glass substrate, and then, the glass substrate is set in a vacuum Digicator while the solution-coated face is oriented upwardly. When the inside of the vacuum Digicator is set at a vacuum pressure by means of a vacuum pump, the coated solution is vaporized, and the viscosity increases. Next, the glass substrate is removed from the vacuum Digicator, and then, is set in an electric furnace. Then, when the inside of the electric furnace is set at a vacuum pressure and the glass substrate is heated in the electric furnace, a buffer film made of $La_{0.7}Sr_{0.3}MnO_{3-x}$ is formed.

Figure 9:
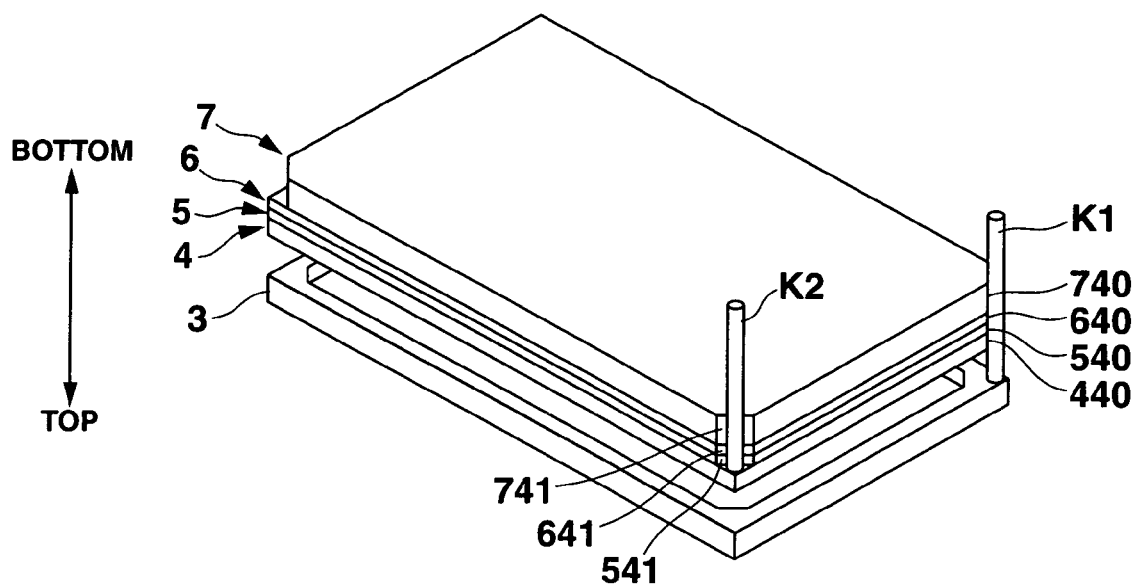
FIG. 9 is a view illustrating a method for joining the second substrate and the first substrate with each other in the reactor of the present embodiment.

Here, as described above, only a metal film adapted for anodic junction is provided on a face serving as a back face of the first substrate 3, and no buffer film is provided. This is because, when a surface of the second substrate 4 and a back face of the first substrate 3 are faced to each other, thereby achieving anodic junction, as shown in FIG. 9 described later, the alkali component in the second substrate 4 moves to the back face side of the second substrate 4, thus making it unnecessary to provide the buffer film on the back face of the first substrate 3. However, even if a buffer film is provided on the back face of the first substrate 3, no problem occurs. Thus, a buffer film and a metal film adapted for anodic junction may be provided on the back face of the substrate 3.

Next, a third substrate 5 is manufactured from one glass substrate. Specifically, first, with respect to one face of the glass substrate (a face serving as a back face of the third substrate 5), a buffer film and a metal film are formed sequentially in this order in accordance with sputtering, and then a metal film for a thin-film heater 55 is formed and patterned. Next, with respect to an opposite face of the glass substrate (a face serving as a top face of FIG. 4), holes 50 and 51, a groove portion 56, groove portions 57a and 57b, a groove portion 58, cutout portions 59a to 59f, and cutout portions 540 and 541 are formed in accordance with a photolithography technique or a sandblasting technique. In addition, with respect to internal faces of the holes 50 and 51, the irradiation proof film 33 may be formed in accordance with sputtering or a vacuum vapor deposition technique. Then, after an alumina sol serving as a catalyst adhesion layer has been applied to the insides of the groove portions 56 and 58, respectively, a reforming catalyst 201 and a carbon monoxide removal catalyst 211 are provided inside the groove portion 56 and inside the groove portion 58, respectively, in accordance with a wash coat technique. In this manner, the third substrate 5 is manufactured.

Next, a fourth substrate 6 is manufactured from one glass substrate. Specifically, first, with respect to one face of the glass substrate (a face serving as a back face of the fourth substrate 6), a buffer film and a metal film are formed sequentially in this order in accordance with sputtering, and then, holes 60 and 61, a groove portion 66, groove portions 67a and 67b, groove portions 69a to 69f, an electrically conductive groove 65, and cutout portions 640 and 641 are formed in accordance with a photolithography technique or a sandblasting technique. In addition, with respect to the internal faces of the holes 60 and 61, the irradiation proof film 33 may be formed in accordance with sputtering or a vacuum vapor deposition technique. Then, after an alumina sol serving as a catalyst adhesion layer has been applied to the inside of the groove portion 66, the combustion catalyst 221 is provided in accordance with a wash coat technique, for example. In this manner, the fourth substrate 6 is manufactured.

In the manufacture of the second substrate 4 to the fifth substrate 7, when the holes 40 and 41 cutout portions 440, cutout portions 59a to 59f and the like are formed on the glass substrate, processing may be applied from both faces of the glass substrate.

(2) Method for Joining the First Substrate 3 to the Fifth Substrate 7

Now, a method for joining each substrate will be described here.

Figure 6:
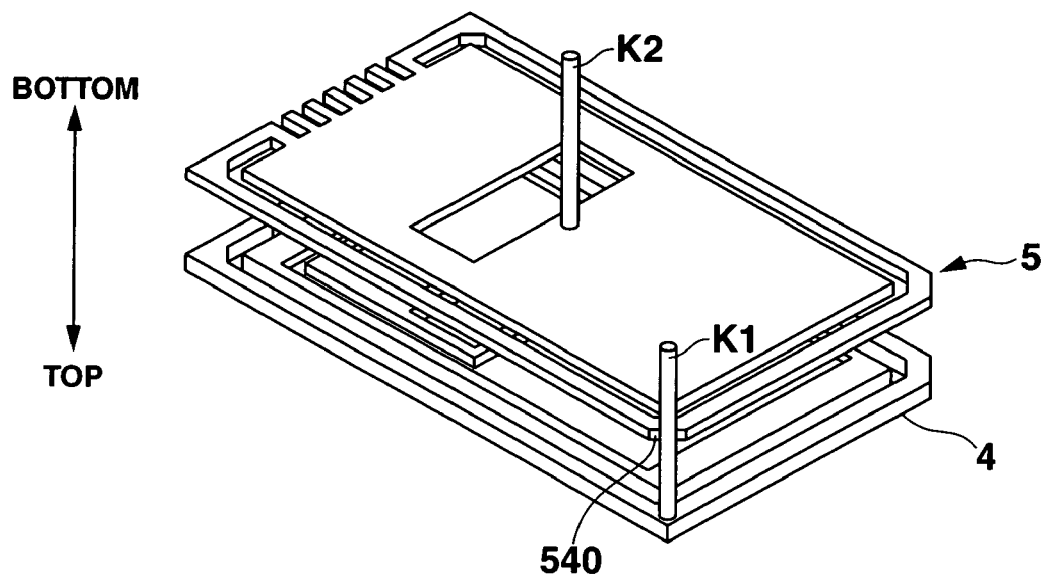
FIG. 6 is a view illustrating a method for joining the second substrate and the third substrate with each other in the reactor of the present embodiment.

FIG. 6 is a view illustrating a method for joining the second substrate and the third substrate with each other in the reactor according to the present embodiment.

Figure 7:
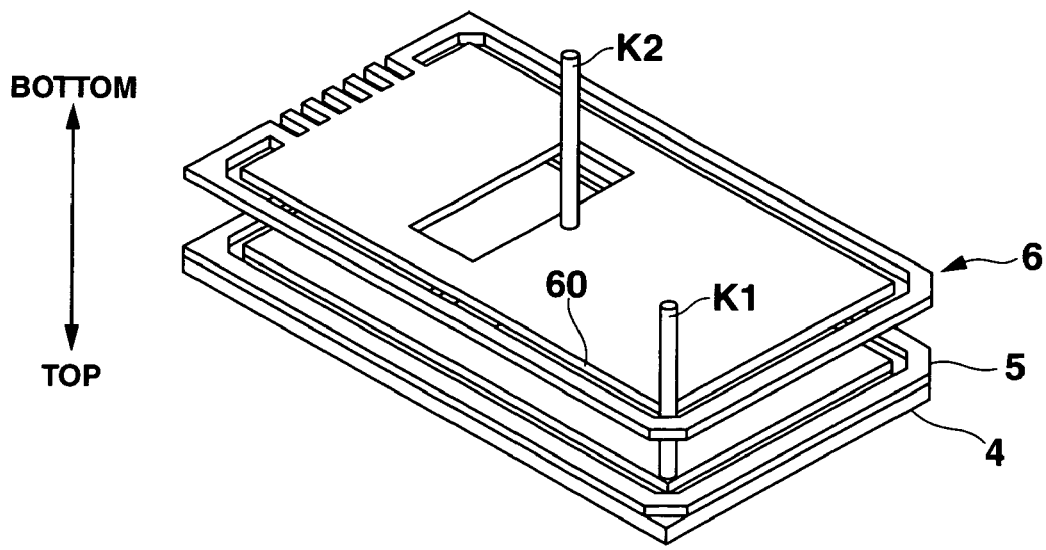
FIG. 7 is a view illustrating a method for joining the third substrate and the fourth substrate with each other in the reactor of the present embodiment.

FIG. 7 is a view illustrating a method for joining the third substrate and the fourth substrate with each other in the reactor according to the present embodiment.

Figure 8:
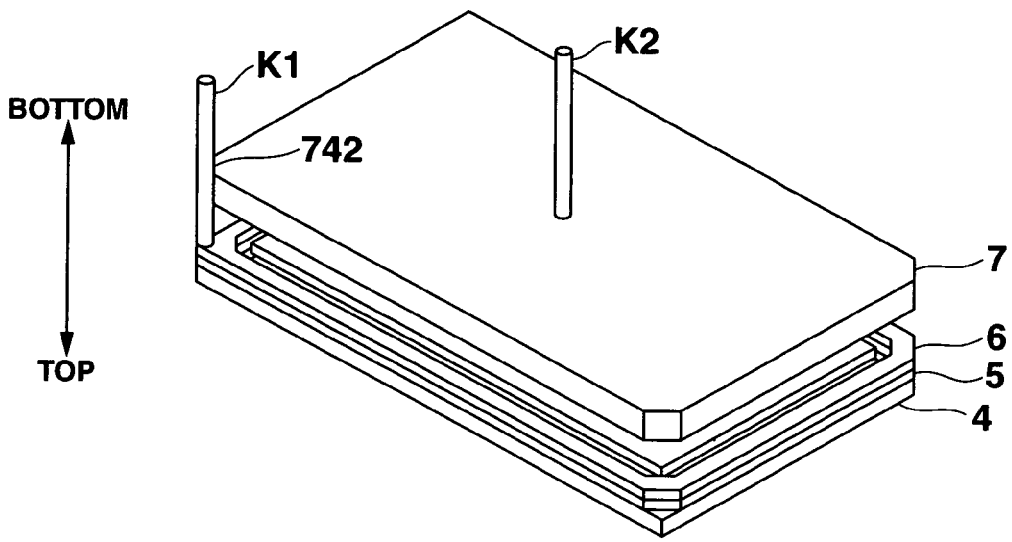
FIG. 8 is a view illustrating a method for joining the fourth substrate and the fifth substrate with each other in the reactor of the present embodiment.

FIG. 8 is a view illustrating a method for joining the fourth substrate and the fifth substrate with each other in the reactor according to the present embodiment.

FIG. 9 is a view illustrating a method for joining the second substrate and the first substrate with each other in the reactor according to the present embodiment.

First, as shown in FIG. 6, after a back face of the second substrate 4 and a surface of the third substrate 5 have been overlapped to be opposed to each other, these second substrate 4 and third substrate 5 are set at an anodic junction device, thereby achieving anodic junction.

Here, in order to prevent a metal film provided on a back face of the third substrate 5 from being oxidized in junction, it is preferable that a junction atmosphere be set in a vacuum filled with an inert gas or in a vacuum at an air pressure that is lower than an atmospheric pressure.

In more detail, after heating the second substrate 4 and the third substrate 5, a cathode K2 is brought into contact with the back face of the third substrate 5 and an anode K1 is brought into contact with the metal film of the second substrate 4 exposed via the cutout portion 541 of the third substrate 5. Then, a predetermined junction temperature is set, and then, a high voltage is applied between the second substrate 4 and the third substrate 5. In this manner, the metal film of the second substrate 4 and the third substrate 5 are chemically bonded with each other, and then, the second substrate 4 and the third substrate 5 are joined with each other. As a result, as shown in FIGS. 3 to 5, the groove portion 46 and the groove portion 56 are obtained as the reforming reaction chamber 200 of the reformer 20, and then, the groove portion 48 and the groove portion 58 are obtained as the carbon monoxide removal flow channel 210 of the carbon monoxide remover 21. In addition, as shown in FIG. 5, the groove portion 47a and the groove portion 57a are obtained as a flow channel 80 that communicates with the reforming reaction chamber 200, and then, the groove portion 47b and the groove portion 57b are obtained as a communication flow channel 89 that communicates between an end of the carbon monoxide removal flow channel 210 and the reforming reaction chamber 200.

Next, the electric wire 55a is resistively welded with the thin-film heater 55 of the third substrate 5 in a junction element of the second substrate 4 and the third substrate 5.

Next, as shown in FIG. 7, after a back face of the junction element of the second substrate 4 and the third substrate 5, namely, a back face of the third substrate 5 and a surface of the fourth substrate 6, have been faced to each other, these fourth substrate 6 and junction element are anode-joined with each other in a state in which the electric wire 55a is routed into an electrically conductive groove 65 of the fourth substrate 6.

Here, in order to prevent a metal film provided on the back face of the fourth substrate 6 from being oxidized in junction, it is preferable that a junction atmosphere be filled with an inert gas or be in a vacuum.

In more detail, after heating the junction element and the fourth substrate 6, a cathode K2 is brought into contact with the back face of the fourth substrate 6 and an anode K1 is brought into contact with the metal film of the third substrate 5 exposed via the hole 60 of the fourth substrate 6. Then, a predetermined junction temperature is set, and a high voltage is applied between the third substrate 5 and the fourth substrate 6. In this manner, the metal film of the third substrate 5 and the fourth substrate 6 are chemically bonded with each other, and the third substrate 5 and the fourth substrate 6 are joined with each other. As a result, as shown in FIGS. 3 to 5, the groove portion 66 is obtained as the combustion reaction chamber 220 of the combustor 22, and then, as shown in FIG. 5, the groove portions 67a and 67b are obtained as flow channels 82 and 83, respectively, that communicate with the combustion reaction chamber 220.

A shown in FIGS. 2 and 5, on an outer face of the reactor 12, the groove portions 49a and 69a and an end of the cutout portion 59a open as fuel supply ports 26; the groove portions 49b and 69b and an end of the cutout portion 59b open as fuel oxygen supply ports 27; the groove portions 49c and 69c and an end of the cutout portion 59c open as oxygen auxiliary supply ports 24; the groove portions 49d and 69d and an end of the cutout portion 59d open as reaction discharge ports 25; the groove portions 49e and 69e and an end of the cutout portion 59e open as reaction supply ports 23; and the groove portions 49f and 69f and an end of the cutout portion 59f open as fuel discharge ports 28. In addition, as shown in FIGS. 3 to 5, a heat insulation chamber 92 is formed of the holes 40, 50, and 60, and then, a heat insulation chamber 93 is formed of the holes 41, 51, and 61.

Next, as shown in FIG. 8, after a back face of a junction element of the second substrate 4 to the fourth substrate 6, namely, a back face of the fourth substrate 6 and a surface of the fifth substrate 7 have been faced to each other, these junction element and fifth substrate 7 are anode-joined. In more detail, after heating the junction element and the fifth substrate 7, a cathode K2 is brought into contact with the back face of the fifth substrate 7 and an anode K1 is brought into contact with the metal film of the fourth substrate 6 exposed via the cutout portion 742 of the fifth substrate 7. Then, a predetermined junction temperature is set, and a high voltage is applied between the fourth substrate 6 and the fifth substrate 7. In this manner, the metal film of the fourth substrate 6 and the fifth substrate 7 are chemically bonded with each other, and the fourth substrate 6 and the fifth substrate 7 are joined with each other. As a result, as shown in FIGS. 3 to 5, a recessed portion 70 is obtained as a heat insulation chamber 91. In addition, all of the metal films for anodic junction provided on the top and back faces of the second substrate 4 to the fifth substrate 7 are joined with each other in the substrate laminate element laminated with the second substrate 4 to the fifth substrate 7.

Next, an end of the electrically conductive groove 65 of the fourth substrate 6 is filled with a low melting point glass sealing agent, the substrate laminate element of the second substrate 4 to the fifth substrate 7 is temporarily fired in an atmospheric environment, and then, the substrate laminate element is primarily fired in a vacuum or nitrogen atmosphere, and the fired laminate element is sealed air-tightly.

In this way, in the substrate laminate element laminated with the fourth substrate 6 having the electrically conductive groove 65, after the second substrate 4 to the fifth substrate 7 have been joined with each other by anodic junction, the end of the electrically conductive groove 65 is filled with a glass sealing material, and then, temporary firing in an atmospheric environment is carried out with respect to the substrate laminate element. As a result, the metal film used for anodic junction is prevented from being oxidized during temporary firing, thus making it possible to enhance reliability of junction between the substrates. In a process from junction between a back face of the junction element of the second substrate 4 and the third substrate 5 and a surface of the fourth substrate 6 up to primary firing of the substrate laminate element of the second substrate 4 to the fifth substrate 7, it is preferable to take care so as not to bring the electric wire 55a into contact with the metal film for anodic junction.

Next, in a surface of the second substrate 4 in the junction element of the second substrate 4 to the fifth substrate 7, a getter element is coated in a film manner onto a region that corresponds to the carbon monoxide remover 21, thereby providing a getter element 32. In addition, a getter element 42 is provided in a region that corresponds to the carbon monoxide remover 21 in a back face of the first substrate 3. However, a getter element may be provided on either one of the second substrate 4 and the first substrate 3.

Next, as shown in FIG. 9, a surface of a junction element of the second substrate 4 to the fifth substrate 7, namely, a surface of the second substrate 4 and a back face of the first substrate 3 have been faced to each other, these junction and first substrate 3 are anode-joined in a vacuum. In more detail, in a state in which the junction element and the first substrate 3 are heated at a temperature equal to or greater than an active temperature of each of the getter elements 32 and 42 as a junction temperature, a cathode K2 is brought into contact with the back face of the second substrate 4 exposed via a cutout portion 541 of the third substrate 5, a cutout portion 641 of the fourth substrate 6 and a cutout portion 741 of the fifth substrate 7 and an anode K1 is brought into contact with the metal film of the first substrate 3 exposed via a cutout portion 440 of the second substrate 4, a cutout portion 540 of the third substrate 5, a cutout portion 640 of the fourth substrate 6, and a cutout portion 740 of the fifth substrate 7, whereby a high voltage is applied between the first substrate 3 and the second substrate 4 in a vacuum equal to or smaller than 1 Pa. In this manner, the metal film of the first substrate 3 and the second substrate 4 are chemically bonded with each other, and then, the first substrate 3 and the second substrate 4 are joined with each other. As a result, as shown in FIGS. 3 to 5, a recessed portion 30 is obtained as a heat insulation chamber 90. This heat insulation chamber 90 communicates with the heat insulation chambers 91 to 93 described above, and then, forms a closely sealed space 9 integrally with these heat insulation chambers 91 to 93. In this manner, the reactor 12 is manufactured.

Now, an operation of the electric power generator 1 will be described here.

First, a fuel (for example, a hydrocarbon-based liquid fuel such as methanol) and water are supplied from the fuel container 10 to the vaporizer 11, and the supplied fuel and water vaporizes in the vaporizer 11.

Next, when a mixture gas of the fuel and water vapor vaporized in the vaporizer 11 flows into the reforming reaction chamber 200 through the reaction supply port 23 of the supply/discharge portion 18 and the flow channel 80, hydrogen or the like is generated by means of the reforming catalyst 201. At this time, heat generated by the thin-film heater 55 and a reaction heat (combustion heat) or the like generated by the combustion reaction chamber 220 are applied to the reforming reaction chamber 200 and heat rays going from the inside to the outside of the reactor 12 is reflected inside of the infrared ray reflection film 31 of the first substrate 3 and the fifth substrate 7. As a result, the reforming reaction chamber 200 is set at a comparatively high temperature, and the reforming catalyst 201 is heated in the range of 200° C. to 400° C. and at about 300° C. in the present embodiment. Although the reforming reaction in the reforming reaction chamber 200 is carried out in accordance with a water vapor reforming technique in the present embodiment, such reaction may be carried out in accordance with a partial oxidation reforming technique. In addition, a fuel and water are supplied from the vaporizer 11 to the reforming reaction chamber 200 via the reaction supply port 23.

Next, when the generated hydrogen or the like and the air having flowed through the oxygen auxiliary supply port 24 of the supply/discharge portion 18 are mixed with each other in a communication flow channel 89, and then made to flow through the carbon monoxide removal flow channel 210, the carbon monoxide in the mixture gas is oxidized and removed by means of the carbon monoxide removal catalyst 211.

At this time, although the reformer 20 and the combustor 22; and the carbon monoxide remover 21 are physically connected to each other via a flow channel portion therebetween, the heat insulation chamber 93 is provided between the reformer 20 and the combustor 22; and the carbon monoxide remover 21. In this manner, a sectional area of a connection portion 100 therebetween is reduced; heat propagation from the reformer 20 and the combustor 22 to the carbon monoxide remover 21 is restricted; and a proper temperature difference is set between the reformer 20 and the carbon monoxide remover 21.

In this manner, the carbon monoxide removal flow channel 210 is set at a comparatively low temperature, and the carbon monoxide removal catalyst 211 is set to 120° C. to 200° C., and 120° C. in the present embodiment.

Next, when air is supplied to an oxygen electrode of the fuel cell 13 and a mixture gas including hydrogen or the like in the carbon monoxide removal flow channel 210 is discharged from the reaction discharge port 25 of the supply/discharge portion 18, and then, is supplied to a fuel electrode of the fuel battery 13, an electric energy is generated in the fuel battery 13.

Next, a mixture gas (off-gas) including unreacted hydrogen in the fuel electrode of the fuel battery 13 flows into the combustion reaction chamber 220 through the fuel supply port 26 of the supply/discharge portion 18 and the flow channel 83, and air externally flows into the combustion reaction chamber 220 through the fuel oxygen supply port 27 of the supply/discharge portion 18 and the flow channel 83. Then, in the combustion reaction chamber 220, hydrogen is combusted; a combustion heat is generated; and a product of water and carbon dioxide or the like is discharged from the fuel discharge port 28 of the supply/discharge portion 18 to the outside via the flow channel 82.

According to the reactor 12 in the above electric power generator 1, the reformer 20 and the carbon monoxide remover 21 are provided in the reactor main body portion 2 in communication with each other by laminating the first substrate 3 to the fifth substrate 7. Thus, unlike a conventional case in which the reformer 20 and the carbon monoxide remover 21 are separately manufactured and are connected to each other by means of a connecting pipe or the like, the reactor main body portion 2 is manufactured in a single step, making it possible to miniaturize the reactor 12. In addition, the reactor main body portion 2 and the hollow package portion 15 are integrally formed. Thus, unlike a case in which the reactor main body portion 2 and the hollow package portion 15 are separately manufactured, and then the reactor main body portion 2 is arranged inside the hollow package portion 15, the reactor 12 is manufactured in a single step. In this manner, the number of steps of manufacturing the reactor 12 can be reduced and the manufacturing cost of the reactor 12 can be reduced.

In addition, for example, in the case where a pipe communicating with the reactor main body portion 2 is inserted into the hollow package portion 15, a gas may leak from a gap between the hollow package portion 15 and the pipe. In contrast, according to the reactor 12, the supply/discharge portion 18 is provided intensively at a support portion 17 connected to the hollow package portion 15, thus making it possible to maintain a closely sealed space of the hollow package portion 15 in a highly closely sealed state. As a result, inconvenience for increasing the closely sealed state of the closely sealed space is simplified.

In addition, the first substrate 3 to the fifth substrate 7 are anode-joined in a vacuum, and thus, the closely sealed space of the hollow package portion 15 is set at a vacuum pressure at the same time as when the first substrate 3 to the fifth substrate 7 are joined with each other. Therefore, inconvenience of separately carrying out the junction of the first substrate 3 to the fifth substrate 7 and suction of the gas in the closely sealed space can be eliminated. As a result, the number of steps of manufacturing the reactor 12 is reduced and manufacturing can be facilitated.

In addition, the getter elements 32 and 42 are provided on an internal face of the envelope portion 16 and on an external face of the reactor main body portion 2, and then, a junction temperature is set to be equal to or greater than a temperature of activating these getter elements at the time of anodic junction between the first substrate 3 and the second substrate 4 to the fifth substrate 7, whereby the degree of vacuum in the closely sealed space can be properly maintained.

In addition, although the reactor main body portion 2 and the vacuum package portion 15 are vacuumed and heat-insulated via the closely sealed space 9, the support portion 17 at which the supply/discharge portion 18 is provided is connected to one end at the side of the carbon monoxide remover 21 of the reactor main body portion 2. As a result, an internal heat of the reformer 20 and the carbon monoxide remover 21 propagates from such one end to the hollow package portion 15. However, positions at which the heat propagates from the reformer 20 of the reactor main body portion 2 and the carbon monoxide remover 21 to the hollow package portion 15 are collectively integrated at one site and the carbon monoxide removal flow channel 210 is set at a comparatively low temperature with respect to the reformer 20, as described above. Thus, a temperature difference from the envelope portion 16 is comparatively small as compared with a case in which a connection portion of the reformer 20 is connected to the hollow package portion 15. Therefore, a rate of heat propagating to the hollow package portion 15 via the support portion 17 can be comparatively reduced. In addition, in the support portion 17, a temperature difference between the carbon monoxide remover 21 at one end side of the support portion 17 and the envelope portion 16 at the other end side is comparatively small, thus making it possible to comparatively reduce a thermal stress applied to the support portion 17 and making it possible to prevent the support portion 17 from being damaged or cracked due to the thermal stress.

In addition, the heat insulation chamber 93 is provided between the reformer 20 and the carbon monoxide remover 21, whereby a sectional area of a flow channel portion connecting the above reformer and remover is reduced, and a rate of heat propagating from the reformer 20 and the combustor 22 to the carbon monoxide remover 21 is restricted. As a result, a proper temperature difference can be provided between the reformer 20 and the carbon monoxide remover 21 and the carbon monoxide removal flow channel 210 can be set at a comparatively low temperature.

Further, the first substrate 3 to the fifth substrate 7 are made of a glass and all of them are made of the same material. Thus, at the time of operation or stoppage of the reactor 12, namely, at the time of increasing or decreasing a temperature of each substrate, a thermal stress caused by a difference in thermal expansion quantity can be reduced, and damage due to a thermal stress of the reactor 12 can be restricted.

In addition, the getter elements 32 and 42 are located in a region that corresponds to the carbon monoxide remover 21 on an internal face of the heat insulation chamber 90. Thus, unlike a case in which they are located in a region that corresponds to the reformer 20 or the combustor 22, the activation of the getter elements 32 and 42 during operation of the reactor 12 can be prevented and the heat rays irradiated from the reformer 20 or the combustor 22 can be reliably reflected on the infrared ray reflection film 31 of the first substrate 3 or the fifth substrate 7.

While the foregoing embodiments have described that the holes 41, 51, and 61 are provided independently of the holes 40, 50, and 60 in the middle of a long edge portion of each of the second substrate 4 to the fourth substrate 6 and the connection portion 100 between the reformer 20 and the carbon monoxide remover 21 is provided at two locations on both ends in a widthwise direction, the present invention is not limited thereto.

Figure 10A:
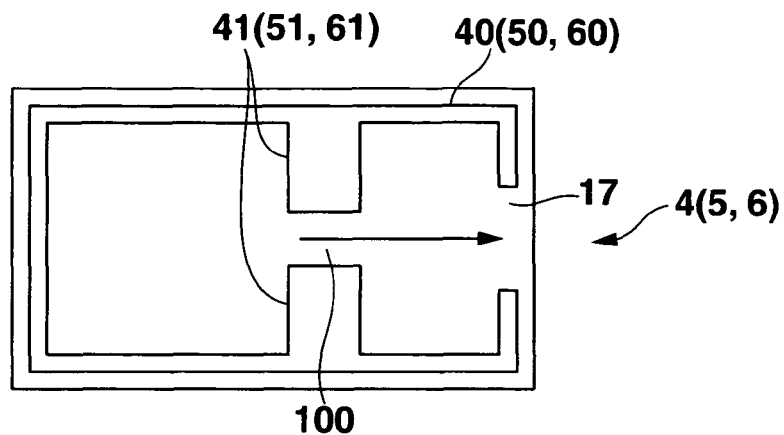
FIGS. 10A to 10C are plan views respectively showing other examples of a configuration of the second substrate to the fourth substrate in the reactor of the present embodiment.
Figure 10B:
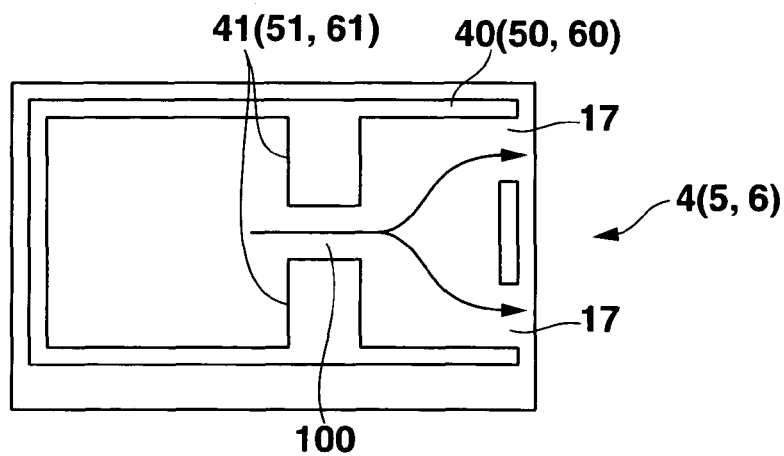
Figure 10C:
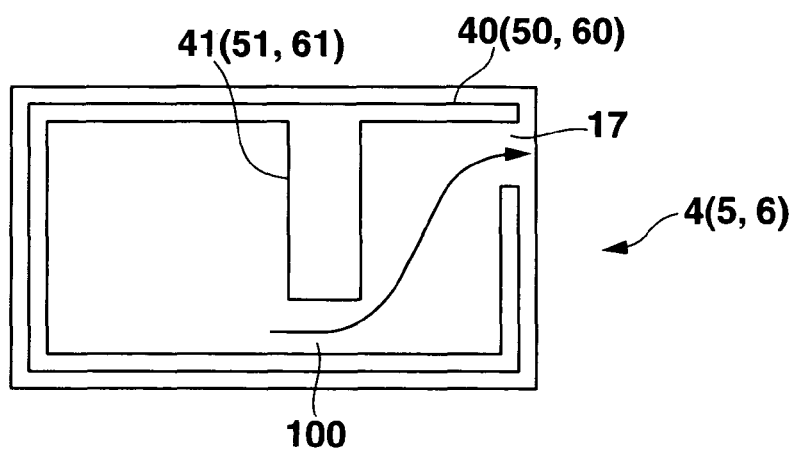

FIGS. 10A to 10C are plan views each showing other examples of configurations of the second substrate to the fourth substrate in the reactor according to the present embodiment.

As shown in FIGS. 10A and 10B, the holes are provided integrally with the holes 40, 50, and 60 in proximity to one long edge portion side of each of the second substrate 4 to the fourth substrate 6 so that the connection portion 100 between the reformer 20 and the carbon monoxide remover 21 may be provided intensively at one site at the center in a widthwise direction.

In addition, as shown in FIG. 10C, the holes may be provided in proximity to one long edge portion side of each of the second substrate 4 to the fourth substrate 6.

While the foregoing embodiments have described that the support portion 17 is provided in the middle of a short edge portion of each of the second substrate 4 to the fourth substrate 6, with holes 40A, 50A, and 60A being interposed, this support portion may be provided in proximity to two long edge portion sides of each of the second substrate 4 to the fourth substrate 6, as shown in FIG. 10B, or may be provided in proximity to the other long edge portion side of each of the second substrate 4 to the fourth substrate 6, as shown in FIG. 10C. Here, heat of the reformer 20 flows from the connection portion 100 between the reformer 20 and the carbon monoxide remover 21 into the hollow package portion 15 via the support portion 17 (refer to the line indicated by the arrow in FIG. 10). Thus, in the case where the positions of the connection portion 100 and the support portion 17 are shifted in the short edge direction of the reactor 12 as in the configurations shown in FIGS. 10B and 10C, heat flows in the short edge direction, thereby improving uniform heat property of the carbon monoxide remover 21.

In addition, while the foregoing embodiments have described that the first substrate 3 to the fifth substrate 7 are anode-joined with each other, respectively, at least part of them may be joined by means of a low melting point glass bonding agent.

There has been provided a configuration in which, after all of the metal films in a substrate laminate element of the second substrate 4 to the fourth substrate 6 have been used for anodic junction, an end of the electrically conductive groove 65 is filled with a glass sealing material, and then, temporary firing is carried out with respect to the substrate laminate element, thereby preventing the metal film used for anodic junction from being oxidized during temporary firing. However, temporary fining may be carried out in another sequence in the case where an anodic junction metal film having strong anti-oxidization property is used.

In addition, while the foregoing embodiments have described that all of the first substrate 3 to the fifth substrate 7 are made of glass, they may be made of ceramics. However, from the viewpoint of preventing a thermal stress from being generated at the time of a temperature change due to a difference in thermal expansion coefficient, it is preferable that the first substrate 3 to the fifth substrate 7 be formed of the same type of material. In the case where the first substrate 3 to the fifth substrate 7 are made of ceramics, a ceramics green sheet formed in the substantially same planar shape as that of the first substrate 3 to the fifth substrate 7 or a suspension solution made of the same material as that of the first substrate 3 to the fifth substrate 7 is sandwiched among the first substrate 3 to the fifth substrate 7, and the laminate element is fired and defatted, whereby the first substrate 3 to the fifth substrate 7 can be joined with each other.

In addition, while the foregoing embodiments have described that the reactor main body portion 2 is formed of three substrates, i.e., the second substrate 4 to the fourth substrate 6, for example, the second substrate 4 and the third substrate 5 are formed in advance to one substrate, whereby the reactor main body portion 2 may be formed of two substrates. In this case, the number of junctions between the substrates can be reduced.

While the foregoing embodiments have described that the inside of the closely sealed space 9 is at a vacuum pressure, an atmosphere at the time of junction is set in an atmosphere containing a rare gas such as argon or helium, whereby the inside of the above space may be filled with the rare gas.

What is claimed is:

1. A reactor comprising:
   a plurality of substrates including (i) a pair of a top substrate and a bottom substrate having provided therein recessed portions for forming closely sealed regions and (ii) a plurality of intermediate substrates having provided therein openings that communicate with each other;
   a reactor main body portion comprising the plurality of intermediate substrates, which are formed to be laminated and joined with each other; and
   an envelope portion which houses the reactor main body portion therein except for one end side of the reactor main body portion via a closely sealed space formed by sandwiching the plurality of laminated intermediate substrates between the top substrate and the bottom substrate, which are laminated and joined with the plurality of laminated intermediate substrates, and by communicating the openings and the recessed portions for forming the closely sealed regions of the plurality of substrates;
   wherein the envelope portion includes a support portion which supports the reactor main body portion via the one end side of the reactor main body portion;
   wherein an inside of the closely sealed space is set at an air pressure that is lower than an atmospheric pressure;
   wherein the reactor main body portion includes at the one end side a plurality of flow channels which supply a reactant and discharge a reacted product, the envelope portion includes on an outer face a supply/discharge portion formed of ends of the plurality of flow channels, and the plurality of flow channels are provided at the support portion;
   wherein the reactor main body portion includes (i) a first reaction unit set at a first temperature, (ii) a second reaction unit set at a second temperature that is lower than the first temperature, and (iii) a connection portion having a plurality of flow channels to communicate between the first reaction unit and the second reaction unit; and
   wherein the one end side of the reactor main body portion is provided at an end of a side of the reactor main body portion at which the second reaction unit is provided.

2. The reactor according to claim 1, wherein the reactor main body portion further includes a heating portion which supplies heat to the first reaction unit and sets the first reaction unit at the first temperature.

3. The reactor according to claim 2, wherein the heating portion sets the second reaction unit at the second temperature via the connection portion.

4. The reactor according to claim 1, wherein the reactor main body portion further includes a heat insulation chamber formed between the first reaction unit and the second reaction unit, wherein the heat insulation chamber is formed from the openings in the plurality of intermediate substrates.

5. The reactor according to claim 1, wherein:
   the reactant is a mixture gas of vaporized water and a fuel including hydrogen atoms;
   the first reaction unit is a reformer that causes a reforming reaction of the reactant and generates a gas including hydrogen; and
   the second reaction unit is a carbon monoxide remover to which the gas including hydrogen is supplied as a reactant, and which removes carbon monoxide included in the gas in accordance with selective oxidization, to output the reacted product.

6. A power supply system which generates electric power and supplies the generated electric power to a load, the system comprising:
   a reactor to which an electric power generation fuel is supplied, and which generates a specific fuel component including hydrogen from the electric power generation fuel; and
   an electric power generation portion including a fuel cell which generates the electric power in accordance with an electrochemical reaction using the specific fuel component,
   wherein the reactor comprises:
      a plurality of substrates including (i) a pair of a top substrate and a bottom substrate having provided therein recessed portions for forming closely sealed regions and (ii) a plurality of intermediate substrates having provided therein openings that communicate with each other;
      a reactor main body portion comprising said plurality of intermediate substrates, which are formed to be laminated and joined with each other; and
      an envelope portion which houses the reactor main body portion therein except for one end side of the reactor main body portion via a closely sealed space formed by sandwiching the plurality of laminated intermediate substrates between the top substrate and the bottom substrate, which are laminated and joined with the plurality of laminated intermediate substrates, and by communicating the openings and the recessed portions for forming the closely sealed regions of the plurality of substrates;
      wherein the envelope portion includes a support portion which supports the reactor main body portion via the one end side of the reactor main body portion;
      wherein an inside of the closely sealed space is set at an air pressure that is lower than an atmospheric pressure;
      wherein the reactor main body portion includes at the one end side a plurality of flow channels which supply a reactant and discharge a reacted product, the envelope portion includes on an outer face a supply/discharge portion formed of ends of the plurality of flow channels, and the plurality of flow channels are provided at the support portion;
      wherein the reactor main body portion includes (i) a first reaction unit set at a first temperature, (ii) a second reaction unit set at a second temperature that is lower than the first temperature, and (iii) a connection portion having a plurality of flow channels to communicate between the first reaction unit and the second reaction unit; and
      wherein the one end side of the reactor main body Portion is provided at an end of a side of the reactor main body Portion at which the second reaction unit is provided.

7. The power supply system according to claim 6, wherein the reactor main body portion further includes a heating portion which supplies heat to the first reaction unit and sets the first reaction unit at the first temperature.

8. The power supply system according to claim 7, wherein the heating portion sets the second reaction unit at the second temperature via the connection portion.

9. The power supply system according to claim 6, wherein the reactor main body portion further includes a heat insulation chamber formed between the first reaction unit and the second reaction unit, wherein the heat insulation chamber is formed from the openings in the plurality of intermediate substrates.

10. The power supply system according to claim 6, wherein:
   the electric power generation fuel is a mixture gas of vaporized water and a fuel including hydrogen atoms;
   the first reaction unit is a reformer to which the mixture gas is supplied as the reactant and which causes a reforming reaction and generates a gas including hydrogen; and
   the second reaction unit is a carbon monoxide remover to which the gas including hydrogen is supplied as a reactant, and which removes carbon monoxide included in the gas in accordance with selective oxidization, to output the reacted product.

* * * * *